W. HILL.
RECORD CABINET.
APPLICATION FILED MAR. 30, 1911.
1,008,823.
Patented Nov. 14, 1911.
2 SHEETS—SHEET 1.
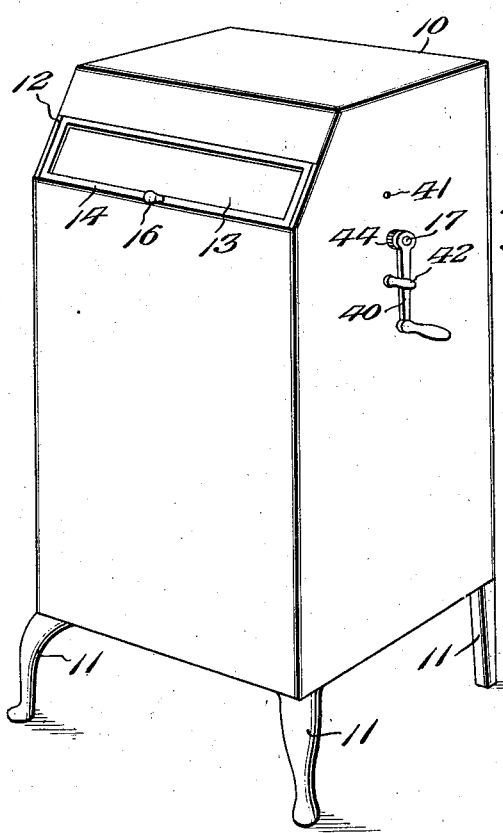
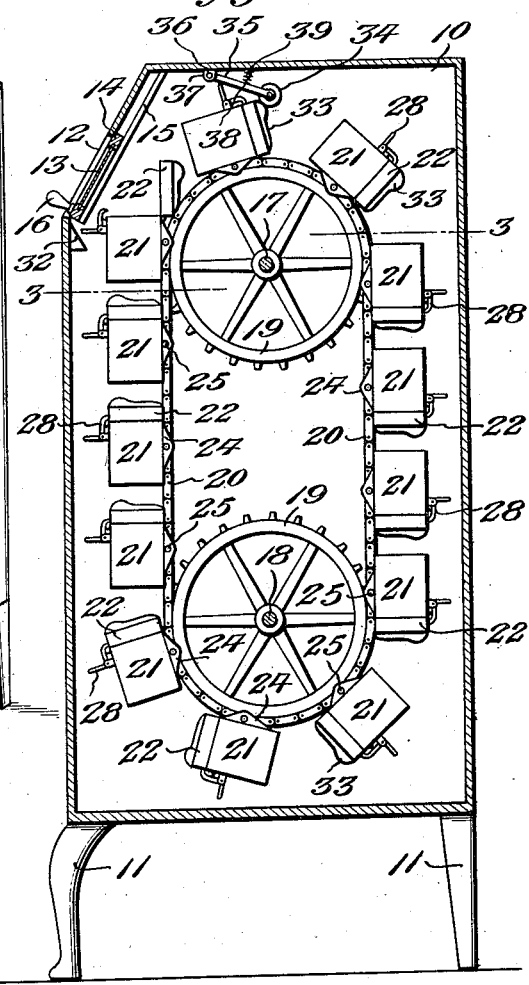
Witnesses
Inventor
Walter Hill
By Victor J. Evans
Attorney W. HILL.
RECORD CABINET.
APPLICATION FILED MAR. 30, 1911.
1,008,823.
Patented Nov. 14, 1911.
2 SHEETS—SHEET 2.
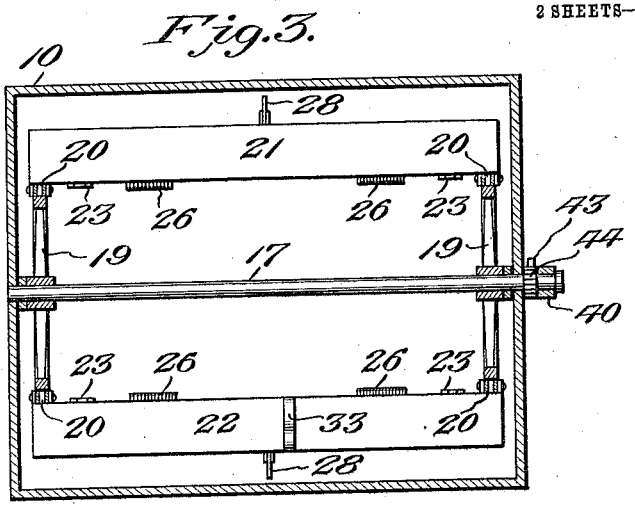
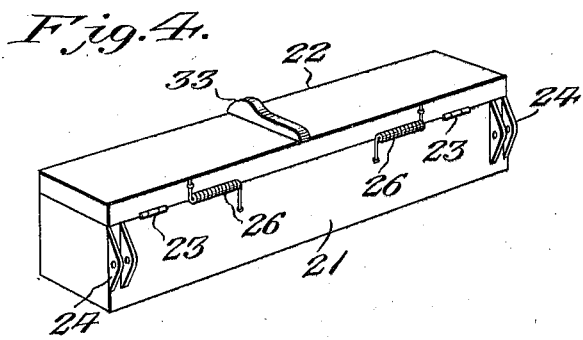
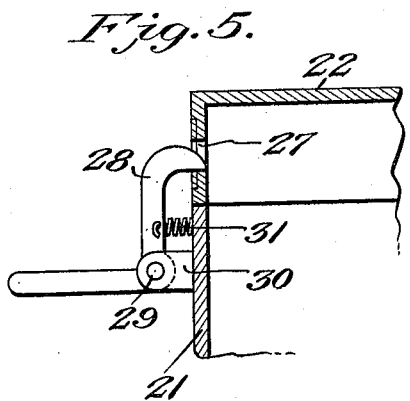
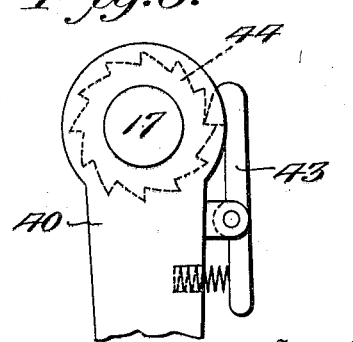
Witnesses
Edwin G. McKee
Inventor
Walter Hill
By Victor J. Evans
Attorney

UNITED STATES PATENT OFFICE.

WALTER HILL, OF BARRYVILLE, NEW YORK.

RECORD-CABINET.

1,008,823.  Specification of Letters Patent.  Patented Nov. 14, 1911.

Application filed March 30, 1911. Serial No. 618,019.

*To all whom it may concern:*

Be it known that I, WALTER HILL, a citizen of the United States, residing at Barryville, in the county of Sullivan and State of New York, have invented new and useful Improvements in Record-Cabinets, of which the following is a specification.

The invention relates to cabinets, and more particularly to the class of talking machine record cabinets.

The primary object of the invention is the provision of a cabinet in which the records for a phonograph may be assorted for the convenient handling thereof, and that may be successively brought into proper position whereby the same may be removed from the cabinet.

Another object of the invention is the provision of a cabinet in which talking machine records are conveniently stored in receptacles, the latter being connected to an endless carrier trained over sprocket elements supported by rotatable shafts, one of said shafts being manually rotated for successively advancing the receptacles for the bringing of the records in position, whereby the same may be readily and conveniently removed from the cabinet when it is desired to use the same, the records when held within the receptacle being free from dust or other foreign matter that would necessarily damage the same.

A further object of the invention is the provision of a cabinet in which the record receiving receptacles are successively advanced, the receptacles being provided with hinged lids normally locked, and upon the successive advancement of said receptacles, the same will be automatically opened, whereby the records contained therein may be readily and conveniently removed or placed therein.

A still further object of the invention is the provision of a cabinet in which the lids of the record receiving receptacles will be automatically opened and closed at proper intervals, whereby access may be had to the records held within the receptacles on the successive advancement thereof for the convenience of the user.

A still further object of the invention is the provision of a cabinet in which talking machine records may be assorted and stored to protect the same from dust and dirt when not in use, and also to obviate any damage thereto.

A still further object of the invention is the provision of a cabinet of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a perspective view of a cabinet constructed in accordance with the invention. Fig. 2 is a vertical longitudinal sectional view thereof. Fig. 3 is a sectional view on the line 3—3 of Fig. 2. Fig. 4 is a perspective view of one of the receptacles removed from the cabinet. Fig. 5 is a fragmentary vertical transverse sectional view through one receptacle, showing the catch in detail. Fig. 6 is a fragmentary side view of the ratchet handle.

Similar reference characters indicate corresponding parts throughout the several views of the drawings.

Referring to the drawings by numerals, the cabinet comprises a suitable case 10 which may be constructed from any suitable material and of any desirable shape and size, and is provided with supporting legs or standards 11, the case 10 at its front, near the top thereof, being provided with an elongated opening 12, whereby access may be had to the interior of the case. The said opening 12 is normally closed by a glass panel 13 fitted within a slidable frame 14, the latter being engaged with guide cleats 15 secured to the front of the case, the frame 14 being provided with a suitable hand knob 16 to permit the opening and closing thereof.

Suitably journaled in the side walls of the case 10 are upper and lower horizontally arranged rotatable shafts 17 and 18, respectively, the same being arranged in alinement with each other medially of the cabinet and have fixed thereto spaced sprocket wheels 19, over which are trained endless sprocket chains 20 forming a conveyer, to which are connected a series of record receiving baskets or receptacles, as will be hereinafter more fully described.

Each receptacle or basket comprises a box-like body 21 carrying a lid 22, the same being connected thereto by means of ordinary hinges 23. The body 21 has formed thereon or otherwise secured thereto spaced outwardly extending wings 24, through which are passed pivot pins 25, the same being also pivoted to the links of the endless chains 20. Thus the receptacles or baskets are secured to the conveyer. Secured to the body 21 of each basket or receptacle are coiled expansion springs 26, the same acting upon the lid 22 to force the same to open position. Each lid 22 is provided with a notch 27 in its front depending flange, with which normally engages a trip catch 28 pivoted, as at 29, to a bearing 30 mounted at the front of the body 21 of the receptacle or basket, whereby the lid will be normally sustained in closed position. To sustain the catch 28 in its locked position or in engagement with the lid for retaining it closed, there is provided a coiled retractile spring 31, the same being connected at one end to the catch 28 and at its opposite end to the body 21 of the receptacle or basket.

Formed on or otherwise secured to the inner face of the front wall of the case 10 near the opening 12 therein, is a trip projection or nose 32, the same protruding into the path of movement of the trip catches 28 for successively releasing the same on the advancement of the series of receptacles or baskets during the travel of the conveyer for the automatic opening of the lid 22 of each receptacle when the same arrives directly in rear of the opening 12 in the case 10 of the cabinet, so that access may be had to the interior of the receptacle or basket, whereby the talking machine records held therein may be conveniently removed therefrom or placed within the same.

Secured to the top of each lid 22 of the receptacles or baskets is a cam block or rib 33, the same being disposed out of alinement with the trip block or projection 32, and is adapted to be engaged by a friction roller 34, mounted in a swinging arm 35, the same being pivoted, as at 36, to a connecting plate 37 fixed to the top wall of the case 10, the friction roller 34 being normally held in the path of movement of the cam block 33 by means of a coiled expansion spring 38, one end of which is engaged with the swinging arm 35 and the opposite end having its bearing against the inner face of the top wall of the said case 10. This spring 38 surrounds a guide post or stem 39 fixed to and projecting inwardly from the top wall of the case 10 and working in a suitable opening formed in the said swinging arm 35, thereby guiding the said swinging arm toward and away from the baskets or receptacles as the same are successively advanced within the cabinet.

It will be evident that when the friction roller 34 engages the cam block 33 on the lid 22 of each basket or receptacle, the said lid 22 will be automatically closed after it has been swung to open position. Thus it will be seen that the lids of the record receiving receptacles or baskets will be automatically opened and closed in successive order when the conveyer is in motion for advancing the said baskets or receptacles.

Fixed to one end of the upper shaft 17 is a hand crank 40 which enables the manual operation of said shaft 17, so that the latter may be turned for causing the endless chains 20 to travel over the sprocket wheels 19, and the chains 20 in their travel will transmit a corresponding rotary movement to the lower shaft 18 and in this manner the talking machine record receiving baskets or receptacles will be successively advanced within the cabinet.

Formed in one side wall of the case 10 are suitable sockets 41, the same being arranged in the path of movement of the crank 40, and either one of which is adapted to receive a removable stop pin 42 which projects into the path of rotation of the crank 40, so as to hold the same against rotation. However, upon removing the stop pin 42, the said crank may be turned the desired degree for the proper positioning of any one of the record receiving receptacles or baskets within the case, with respect to the opening 12 therein, so that the lid of said basket or receptacle will be automatically raised to permit access to be had to the interior thereof, whereby the record contained therein may be readily removed for use. The crank 40 is provided with a spring held ratchet pawl 43, the latter being normally engaged with a ratchet wheel 44 fixed to the shaft 17. Thus the said crank may be operated by alternate half turns for rotating the shaft 17 for the successive advancement of the record baskets within the cabinet.

From the foregoing, it is thought that the construction and operation of the invention will be readily understood, without requiring a more extended explanation, and therefore the same has been omitted.

Attention will be directed to the fact that the cabinet may be used for holding any articles that may be desired, that is to say which may be comfortably held within the receptacles or pockets. Thus it will be seen that the cabinet may be used for other purposes than holding talking machine records.

What is claimed is:

1. A cabinet of the class described, comprising a casing, an endless conveyer arranged for travel within said casing, a plurality of baskets connected with said conveyer, hinged lids carried by the baskets, trip catches pivoted to the baskets, and adapted to engage notches in the lids, normally locking the lids in closed position, a nose arranged on the casing in the path of movement of the trip catches for releasing the same whereby the lids will be automatically freed for the opening thereof in successive order, a spring pressed pivoted arm carrying a friction roller in its free end being mounted in the top of the casing and arranged in the path of movement of the lids when in open position for automatically closing the same.

2. A cabinet of the class described comprising a casing an endless conveyer arranged for travel within said casing, a plurality of baskets connected with the said conveyer, hinged lids carried by the baskets, coil expansion springs arranged adjacent the said hinges, trip catches pivoted to the baskets, said catches being angular in shape, and adapted to engage notches in the lids normally locking the lids in closed position, a nose arranged on the casing in the path of movement of the trip catches for releasing the same whereby the lids will be automatically freed for the opening thereof, in successive order, a spring pressed pivoted arm carrying a friction roller in its free end being mounted in the top of the casing, and arranged in the path of movement of the lids when in open position, to engage a cam block on the lids, of each of the baskets for automatically closing the same.

In testimony whereof I affix my signature in presence of two witnesses.

WALTER HILL.

Witnesses:
Jas. K. Gardner,
Peter V. Beauron.

Copies of this patent may be obtained for five cents each, by addressing the "Commissioner of Patents, Washington, D. C."